United States Patent
El Kallassi et al.

(10) Patent No.: US 10,540,027 B2
(45) Date of Patent: Jan. 21, 2020

(54) FORCE SENSING IN A TOUCH DISPLAY (71) Applicant: SYNAPTICS INCORPORATED, San Jose, CA (US)

(72) Inventors: Pascale El Kallassi, Menlo Park, CA (US); Do Hee Kim, San Jose, CA (US); Patrick Smith, San Jose, CA (US); Richard Schediwy, Union City, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 28 days.

(21) Appl. No.: 15/199,333

(22) Filed: Jun. 30, 2016

(65) Prior Publication Data

US 2018/0004337 A1   Jan. 4, 2018

(51) Int. Cl.
G06F 3/041     (2006.01)
G06F 3/044     (2006.01)

(52) U.S. Cl.
CPC ............ *G06F 3/0412* (2013.01); *G06F 3/044* (2013.01)

(58) Field of Classification Search
CPC ...... G06F 3/0416; G06F 3/0412; G06F 3/044; G06F 3/0414; G06F 2203/04111
See application file for complete search history.

(56) References Cited

U.S. PATENT DOCUMENTS

| | | | |
|---|---|---|---|
| 2002/0149571 A1 | 10/2002 | Roberts | |
| 2004/0156168 A1 | 8/2004 | LeVasseur et al. | |
| 2005/0052425 A1 | 3/2005 | Zadesky et al. | |
| 2006/0279553 A1 | 12/2006 | Soss et al. | |
| 2007/0229464 A1 | 10/2007 | Hotelling et al. | |
| 2010/0024573 A1 | 2/2010 | Daverman et al. | |
| 2010/0033448 A1 | 2/2010 | Koito et al. | |
| 2010/0253645 A1* | 10/2010 | Bolender | G06F 3/0414 345/174 |
| 2011/0057899 A1 | 3/2011 | Sleeman et al. | |
| 2011/0141052 A1 | 6/2011 | Bernstein et al. | |
| 2011/0141053 A1 | 6/2011 | Bulea et al. | |
| 2012/0105358 A1 | 5/2012 | Momeyer et al. | |
| 2013/0082970 A1 | 4/2013 | Frey et al. | |
| 2013/0135244 A1 | 5/2013 | Lynch et al. | |
| 2014/0002113 A1* | 1/2014 | Schediwy | G06F 3/044 324/661 |
| 2014/0085213 A1 | 3/2014 | Huppi et al. | |
| 2015/0169091 A1 | 6/2015 | Ho et al. | |
| 2015/0242037 A1 | 8/2015 | Pedder et al. | |

(Continued)

FOREIGN PATENT DOCUMENTS

| | | |
|---|---|---|
| WO | WO-15077018 A1 | 5/2015 |
| WO | WO-15080696 A1 | 6/2015 |

(Continued)

*Primary Examiner* — Yaron Cohen
(74) *Attorney, Agent, or Firm* — Paradice & Li LLP (57) ABSTRACT

Embodiments described herein include a display device that includes a display substrate coupled to a frame. A stiffener substrate is also coupled to the frame. A first force sensing element is disposed on the stiffener substrate, and the stiffener substrate is disposed between the first force sensing element and the display substrate. The display device also includes a second force sensing element, where a distance between the first force sensing element and the second force sensing element decreases when the display substrate is deflected.

22 Claims, 8 Drawing Sheets

(56) References Cited

U.S. PATENT DOCUMENTS

2015/0363019 A1 12/2015 Schediwy et al.
2016/0034092 A1 2/2016 Schmitt et al.
2016/0062500 A1 3/2016 Kessler et al.
2016/0070398 A1 3/2016 Worfolk
2016/0077648 A1 3/2016 Hsieh

FOREIGN PATENT DOCUMENTS

WO    WO-15195287 A1    12/2015
WO    WO-16022778 A1    2/2016

* cited by examiner

FORCE SENSING IN A TOUCH DISPLAY

BACKGROUND

Field of the Disclosure

Embodiments of the present invention generally relate to a method and apparatus for input sensing, and more specifically, to processing a received signal.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

A number of techniques have been attempted for measuring force behind a liquid crystal display (LCD) module, organic light emitting diode (OLED) module, or an electronic ink (e-ink) module. An LCD display comprises a color filter glass layer and a thin-film transistor (TFT) glass layer with a liquid crystal material between the two glass layers. Underneath the TFT glass layer are optical layers attached to an edge by a frame that is secured to the TFT glass. A first example technique for measuring force includes attaching a capacitive sensor to one of the optical layers to measure force. This technique, however, results in hysteresis and drift effects, because the optical layer is not rigidly secured to the TFT glass. In other words, a force applied to an input surface of a display module might not cause a force sensor to move in sync with the application of the force to the input surface, due to bending, compression, or other physical attributes of the intervening layers.

A second technique for measuring force is to add a foam layer between the capacitive sensor and ground or a grounded mid-frame of a housing. However, the foam layer can cause short term drift effects.

SUMMARY

Embodiments described herein include a display device that includes a display substrate coupled to a frame. A stiffener substrate is also coupled to the frame. A first force sensing element is disposed on the stiffener substrate, and the stiffener substrate is disposed between the first force sensing element and the display substrate. The display device also includes a second force sensing element, wherein a distance between the first force sensing element and the second force sensing element decreases when the display substrate is deflected.

In another embodiment, an input device includes a plurality of capacitive sensing electrodes configured to receive a signal. The input device also includes a display device coupled to the plurality of sensing electrodes. The display device includes a display substrate coupled to a frame and a stiffener substrate coupled to the frame. The display device also includes a first force sensing element disposed on the stiffener substrate. The stiffener substrate is disposed between the first force sensing element and the display substrate. The display device also includes a second force sensing element. A distance between the first force sensing element and the second force sensing element decreases when the display substrate is deflected.

In another embodiment, a processing system for a force sensing device includes a force determination module configured to determine a force detected by a first force sensing element, wherein the force is received at an input surface, and wherein the first force sensing element is configured to deflect toward a second force sensing element. The processing system also includes force driver circuitry configured to drive the first force sensing element and the second force sensing element for sensing the force applied to an input surface. The force is transmitted from a display substrate to a stiffener substrate, and the first force sensing element is disposed on the stiffener substrate.

In any of the embodiments described herein, the stiffener substrate can be "shaped" in any suitable manner. For example, the stiffener substrate can be flat, or the stiffener substrate can have a concave or a convex shape, so that the stiffener substrate bends towards or away from the display substrate.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments of the present technology provide input devices and methods for improving usability. Embodiments described herein advantageously provide techniques for measuring force behind a liquid crystal display (LCD) module, an organic light emitting diode (OLED) module, or an electronic ink (e-ink) module. Particularly, embodiments described herein utilize a rigid substrate, such as a stiffener plate or stiffener substrate, attached to the frame with the force sensor attached to or patterned onto the rigid substrate. In general, the stiffener substrate is stiffer than the force sensor. However, the stiffener substrate is not entirely rigid, as it must allow deflection to occur in order to measure force. When a force is applied to the input surface, the force is transmitted to the stiffener substrate. Because the force sensor is attached to the stiffener substrate, the force sensor moves in sync with the input surface when a force is applied. Hysteresis and drift effects are advantageously reduced.

Figure 1:
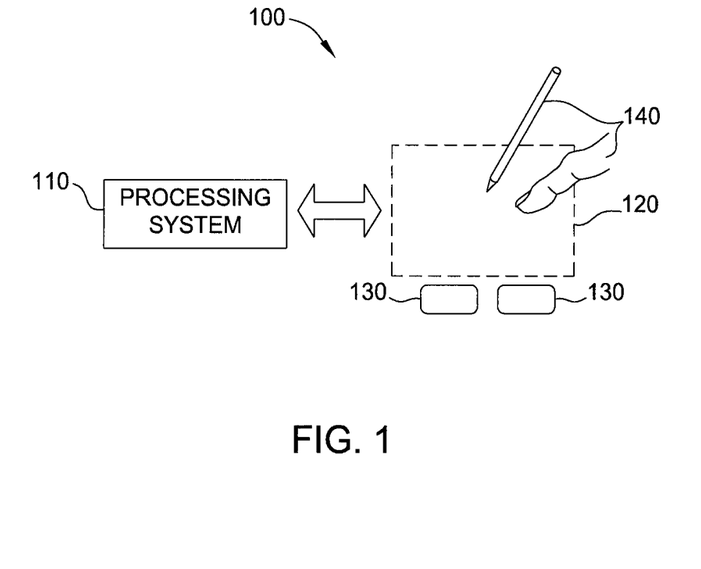
FIG. 1 is a block diagram of a system that includes an input device according to an embodiment.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), electronic ink (E Ink), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
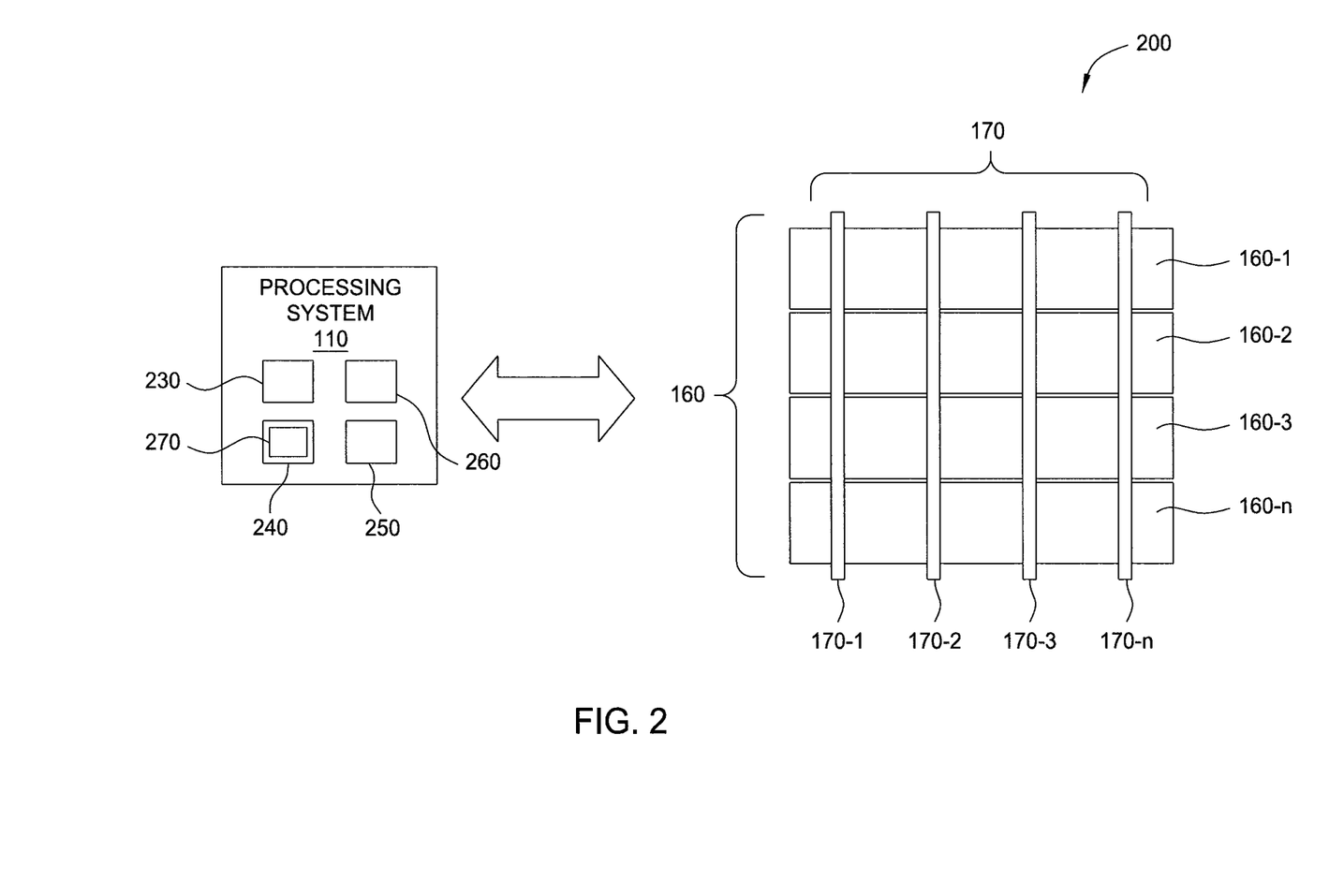
FIG. 2 is an example sensor electrode pattern according to an embodiment.

FIG. 2 illustrates a system 200 including a processing system 110 and a portion of an example sensor electrode pattern configured to sense in a sensing region associated with the pattern, according to some embodiments. For clarity of illustration and description, FIG. 2 shows a pattern of simple rectangles illustrating sensor electrodes, and does not show various components. This sensor electrode pattern comprises a first plurality of sensor electrodes 160 (160-1, 160-2, 160-3, . . . 160-n), and a second plurality of sensor electrodes 170 (170-1, 170-2, 170-3, . . . 170-n) disposed over the plurality of sensor electrodes 160.

Although not illustrated in FIG. 2, a separate force sensor can be placed underneath the display screen by disposing force sensing electrodes there. Embodiments described herein may use such a separate force sensor to sense force. In other embodiments, the sensor electrodes as described herein with respect to FIG. 2 are used to sense force.

Sensor electrodes 160 and sensor electrodes 170 are typically ohmically isolated from each other. That is, one or more insulators separate sensor electrodes 160 and sensor electrodes 170 and prevent them from electrically shorting to each other. In some embodiments, sensor electrodes 160 and sensor electrodes 170 are separated by insulative material disposed between them at cross-over areas; in such constructions, the sensor electrodes 160 and/or sensor electrodes 170 may be formed with jumpers connecting different portions of the same electrode. In some embodiments, sensor electrodes 160 and sensor electrodes 170 are separated by one or more layers of insulative material. In some other embodiments, sensor electrodes 160 and sensor electrodes 170 are separated by one or more substrates; for example, they may be disposed on opposite sides of the same substrate, or on different substrates that are laminated together.

In other embodiments, one or more of sensor electrodes 160 or 170 are disposed on the same side or surface of the common substrate and are isolated from each other in the sensing region 120. The sensor electrodes 160 and 170 may be disposed in a matrix array where each sensor electrode may be referred to as a matrix sensor electrode. Each sensor electrode may be substantially similar size and/or shape. In one embodiment, one or more of sensor electrodes of the matrix array of sensor electrodes 160 and 170 may vary in at least one of size and shape. Each sensor electrode of the matrix array may correspond to a pixel of a capacitive image. Further, two or more sensor electrodes of the matrix array may correspond to a pixel of a capacitive image. In various embodiments, each sensor electrode of the matrix array may be coupled to a separate capacitive routing trace of a plurality of capacitive routing traces. In various embodiments, the sensor electrodes 160 or 170 comprise one or more grid electrodes disposed between at least two sensor electrodes. The grid electrode and at least one sensor electrode may be disposed on a common side of a substrate, different sides of a common substrate and/or on different substrates. In one or more embodiments, the sensor electrodes and the grid electrode(s) may encompass an entire voltage electrode of a display device. Although the sensor electrodes may be electrically isolated on the substrate, the electrodes may be coupled together outside of the sensing region 120—e.g., in a connection region. In one embodiment, a floating electrode may be disposed between the grid electrode and the sensor electrodes. In one particular embodiment, the floating electrode, the grid electrode and the sensor electrode comprise the entirety of a common electrode of a display device.

The areas of localized capacitive coupling between sensor electrodes 160 and sensor electrodes 170 may be termed "capacitive pixels." The capacitive coupling between the sensor electrodes 160 and sensor electrodes 170 change with the proximity and motion of input objects in the sensing region associated with the sensor electrodes 160 and sensor electrodes 170.

In some embodiments, the sensor pattern is "scanned" to determine these capacitive couplings. That is, the sensor electrodes 160 are driven to transmit transmitter signals. Transmitters may be operated such that one sensor electrode transmits at one time, or multiple sensor electrodes transmit at the same time. Where multiple sensor electrodes transmit simultaneously, these multiple sensor electrodes may transmit the same transmitter signal and effectively produce an effectively larger sensor electrode, or these multiple sensor electrodes may transmit different transmitter signals. For example, multiple sensor electrodes may transmit different transmitter signals according to one or more coding schemes that enable their combined effects on the resulting signals of sensor electrodes 170 to be independently determined.

The receiver sensor electrodes 170 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, sensor electrodes 160 comprise one or more display electrodes used in updating the display of the display screen. These display electrodes may be disposed on an appropriate display screen substrate. For example, the display electrodes may be disposed on the TFT glass in some display screens (e.g., In Plane Switching (IPS) or Plane to Line Switching (PLS)), on the bottom of the color filter glass of some display screens (e.g., Patterned Vertical Alignment (PVA) or Multi-domain Vertical Alignment (MVA)), etc. In such embodiments, the display electrodes may be segments of a segmented common voltage electrode (common electrodes), source electrodes, gate electrodes, cathode electrodes, and anode electrodes of a display device. In various embodiments, each sensor electrode 160 comprises one or more display electrodes. In other embodiments, at least two sensor electrodes 160 may share at least one display electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g., combination electrodes).

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats.

Processing system 110 may include driver circuitry 230, force driver circuitry 240, force determination module 250, and an optional memory 260. The processing system 110 is coupled to sensor electrodes 170 and sensor electrodes 160 through a plurality of conductive routing traces (not shown in FIG. 2).

The force driver circuitry 240, which may be part of a module including firmware and other hardware elements, is coupled to the plurality of sensor electrodes 170 and configured to drive resulting signals for sensing force in the sensing region 120. The force driver circuitry 240 may also be configured to pass the resulting signals to the force determination module 250 for determining an applied force and/or to the optional memory 260 for storage. Force driver circuitry 240 may also drive sensor electrodes. In various embodiments, the IC of the processing system 110 may be coupled to drivers for driving the sensor electrodes 160. The drivers may be fabricated using thin-film-transistors (TFT) and may comprise switches, combinatorial logic, multiplexers, and other selection and control logic.

Force driver circuitry 240 may also drive sensing elements for determining the presence of an input object. In various embodiments, the IC of the processing system 110 may be coupled to drivers for driving the sensor electrodes.

The force determination module 250 may comprise force determination circuitry that includes firmware and other hardware elements in some embodiments. Force determination module 250 may also be made up of firmware and/or software elements in some embodiments. Force determination module 250 is configured to determine a force applied to a force sensing element, as described in further detail below. The force sensing element is configured to deflect toward another force sensing element. A distance between two force sensing elements decreases when a deflection occurs, and the force determination circuitry determines a force based on the deflection. One of the force sensing elements may be driven with a constant voltage. Force determination module processes could be attributed to processing system 110 or to a general purpose processor in some embodiments.

Driver circuitry 230 may be configured for updating images on the display screen of a display device (not shown). For example, the driver circuitry 230 may include display circuitry and/or sensor circuitry configured to apply one or more pixel voltages to the display pixel electrodes through pixel source drivers. The display and/or sensor circuitry may also be configured to apply one or more common drive voltages to the common electrodes to update the display screen. In addition, the processing system 110 is configured to operate the common electrodes as transmitter electrodes for input sensing by driving transmitter signals onto the common electrodes. In some embodiments, driver circuitry 230 may be included in a processing system element that comprises firmware/software elements and/or other hardware elements.

The processing system 110 may be implemented with one or more ICs to control the various components in the input device. For example, the functions of the IC of the processing system 110 may be implemented in more than one integrated circuit that can control the display module elements (e.g., common electrodes) and drive transmitter signals and/or receive resulting signals received from the array of sensing elements. In embodiments where there is more than one IC of the processing system 110, communications between separate processing system ICs may be achieved through a synchronization mechanism, which sequences the signals provided to the sensor electrodes 160. Alternatively the synchronization mechanism may be internal to any one of the ICs.

Processing system 110 may also comprise a receiver 270 that interfaces sensors to other components. The receiver 270 may comprise an analog front end (AFE) in some embodiments, and will be referred to as AFE 270 in this example embodiment for convenience. Other receiver implementations may be used in other embodiments. The AFE 270 may be embodied in force driver circuitry 240 or in one or more other components of processing system 110.

Embodiments described herein provide techniques for detecting force behind a display, such as an LCD module, OLED module, or e-ink module. In an LCD module, optical layers are attached to an edge by a frame that is coupled to a TFT substrate, which may be glass in certain embodiments. The frame may be secured, such as by bonding with epoxy, glue, or other adhesive, to the TFT substrate, and the frame may be plastic or metal in some embodiments. A force sensor comprising one or more force sensing elements is attached to the frame or attached to a rigid substrate (also known as a stiffener plate or stiffener substrate) that is attached to the frame. The rigid substrate can be comprised of glass, a metal material like stainless steel, or any other suitable material. When a cover glass on the LCD module deflects, the TFT substrate, frame, stiffener plate, and force sensor also deflect. The force sensor's movement is used to detect the force applied to the cover glass. Force can be determined by detecting a change in capacitance between the force sensor and ground in one example. In any of the embodiments described herein, force sensing can be accomplished with either transcapacitance sensing or absolute capacitance sensing. A force sensing element can be driven for absolute capacitance sensing while another force sensing element is driven with a constant voltage. In addition, a second force sensing element (or an electrode of a second force sensing element) can be driven with a constant voltage or modulated differently (phase, amplitude, and/or frequency) from a first force sensing element (or an electrode of the first force sensing element). For transcapacitance sensing, a force sensing element can operate by detecting the capacitive coupling between one or more transmitter sensor electrodes and one or more receiver sensor electrodes. The transmitter sensor electrodes and receiver sensor electrodes may be arranged in various configurations, as described in further detail below.

A similar embodiment provides techniques for detecting force in an OLED module. Certain optical layers utilized in LCD displays are not needed for OLED displays. However, a force sensor attached to a frame or attached to a rigid substrate that is attached to the frame can also be used in an OLED module to detect force, according to embodiments described herein.

Figure 3:
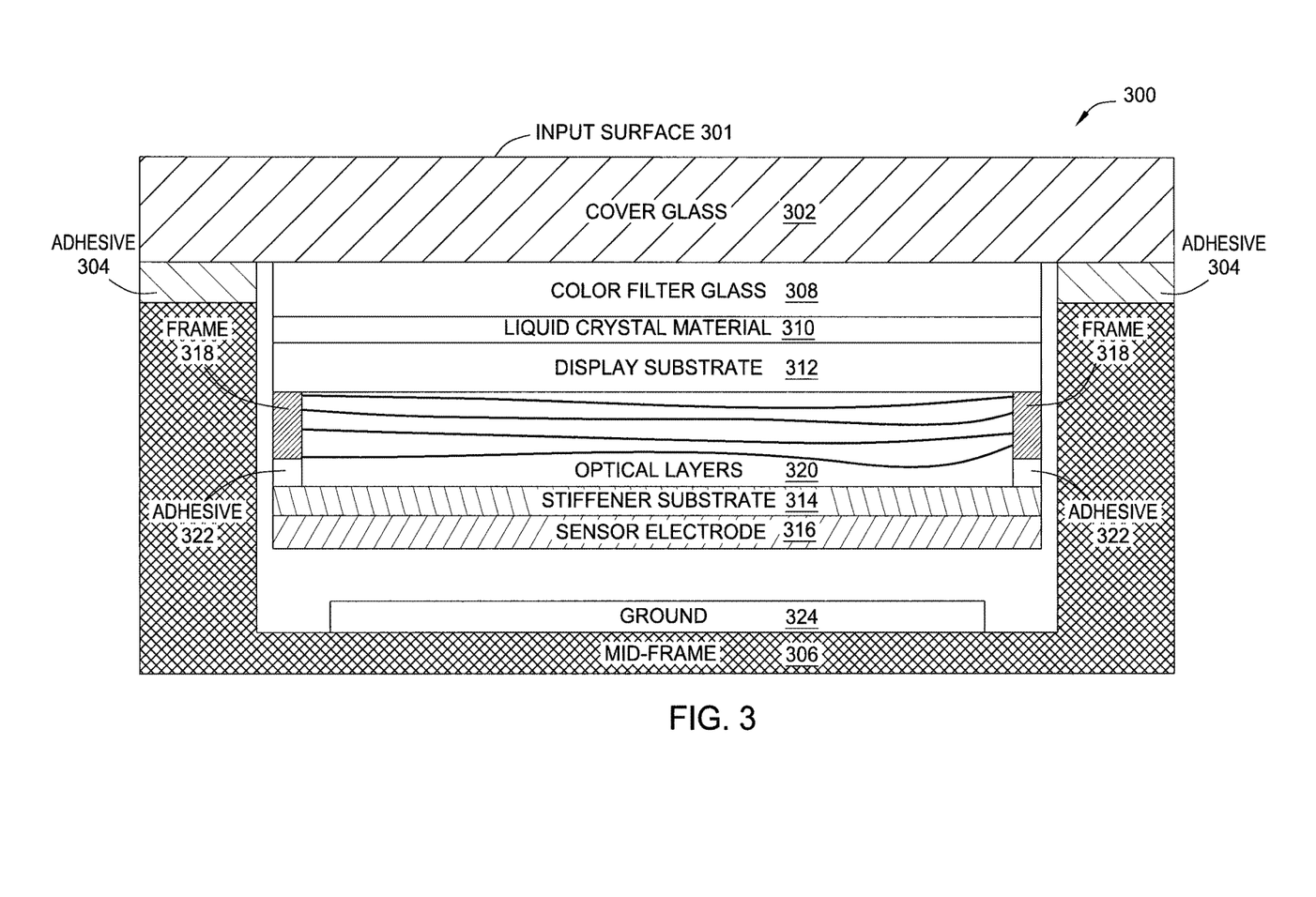
FIG. 3 illustrates an example force sensing input device according to an embodiment.

FIG. 3 illustrates an example force sensing input device 300 according to one embodiment. Cover glass 302 is disposed above various layers of the input device 300. Cover glass 302 also comprises an input surface 301 that receives an input from a user, such as a force or a touch input. Below cover glass 302 are color filter glass 308, liquid crystal material 310, and a display substrate 312. Display substrate 312 could comprise a TFT substrate in some embodiments. Below display substrate 312 are a variety of optical layers 320. These optical layers may include a light guide, brightness enhancement film (BEF), a diffuser, and a reflector. Edges of the optical layers 320 are secured to the frame 318. Frame 318 is secured to display substrate 312, for example with an adhesive.

Because a sensor electrode attached to an optical layer results in some of the disadvantages described above, a stiffener substrate 314 is attached to frame 318 with an adhesive 322 in this embodiment. The stiffener substrate 314 is stainless steel in some embodiments. In some embodiments the stiffener substrate is a reflective layer. The stiffener substrate 314 comprises a thickness of approximately 50-200 microns in some embodiments. Sensor electrode 316 is attached to the stiffener substrate 314. Sensor electrode 316 can comprise a transcapacitance or absolute capacitance sensor. Sensor electrode 316 can be patterned onto stiffener substrate 314, adhered to stiffener substrate 314, or attached to stiffener substrate 314 in any other suitable manner. Sensor electrodes that comprise sensor electrode 316 can be printed or deposited directly on stiffener substrate 314 in some embodiments. In other embodiments, sensor electrodes that comprise sensor electrode 316 can be printed on a thin substrate that is adhered to stiffener substrate 314.

In the embodiment illustrated in FIG. 3, when a force is applied to input surface 301 of cover glass 302 by an input object 140, sensor electrode 316 moves in sync with cover glass 302. The force causes the stack of layers (cover glass 302, and layers 308, 310, and 312, stiffener substrate 314, frame 318, and sensor electrode 316) to deflect a distance relative to the size of the applied force towards ground 324.

An adhesive 304 couples mid-frame 306 to cover glass 302. The mid-frame 306 is a component of the housing of input device 300, but other components of the housing are not illustrated for simplicity. Force sensing is performed between sensor 316 and ground 324. When a force is applied to cover glass 302, sensor 316 and the layers between cover glass 302 and sensor 316 are deflected downward, so that the distance between sensor 316 and ground 324 decreases. Force is determined by measuring a change in capacitance detected by sensor 316.

In some embodiments, a position sensor (comprising sensor electrodes 160 and 170) is included in the force sensing input device 300. Position detection in conjunction with force sensor detection allows for processing algorithms in processing system 110 to provide more robust force sensing. For example, a force applied at an edge of the input surface 301 may deflect the stiffener substrate 314 differently than the same force applied to the center of the input surface 301. Thus, by accounting for the location where the input object 140 applies the force to the input surface 301, the information obtained from sensor electrode 316 can be more accurately resolved into the actual force applied to input surface 301. Position sensors may be included in any of the embodiments described herein.

Figure 4:
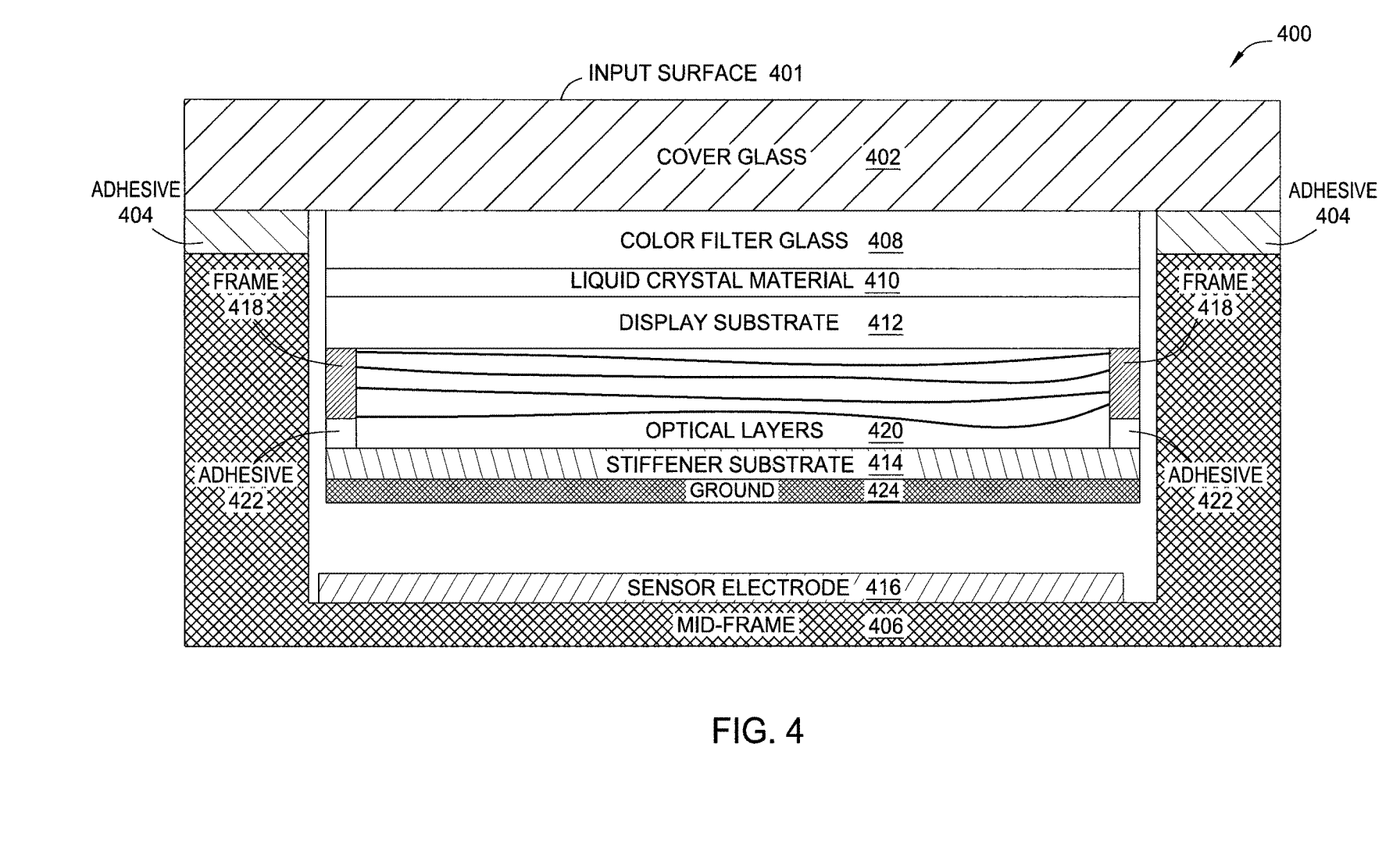
FIG. 4 illustrates another example force sensing input device according to an embodiment.

FIG. 4 illustrates another example force sensing input device 400 according to one embodiment. Many of the components illustrated in FIG. 4 are similar to those in FIG. 3. Cover glass 402 is disposed above various layers of the input device 400. Cover glass 402 also comprises an input surface 401 that receives an input from a user, such as a force or a touch input. Below cover glass 402 are color filter glass 408, liquid crystal material 410, and a display substrate 412. Below display substrate 412 are a variety of optical layers 420. Edges of the optical layers 420 are secured to the frame 418. Frame 418 is secured to display substrate 412, for example with an adhesive. Adhesive 404 couples mid-frame 406 to cover glass 402.

In force sensing input device 400, stiffener substrate 414 is attached to frame 418 with adhesive 422. A ground layer 424 is attached to stiffener substrate 414. In contrast to force sensing input device 300, in this embodiment sensor electrode 416 is glued or otherwise secured to mid-frame 406.

When a force is applied to cover glass 402, ground 424 and the layers between cover glass 402 and ground 424 are deflected downward, so that the distance between sensor electrode 416 and ground 424 decreases. Force is determined by measuring a change in capacitance detected by sensor electrode 416.

Figure 5:
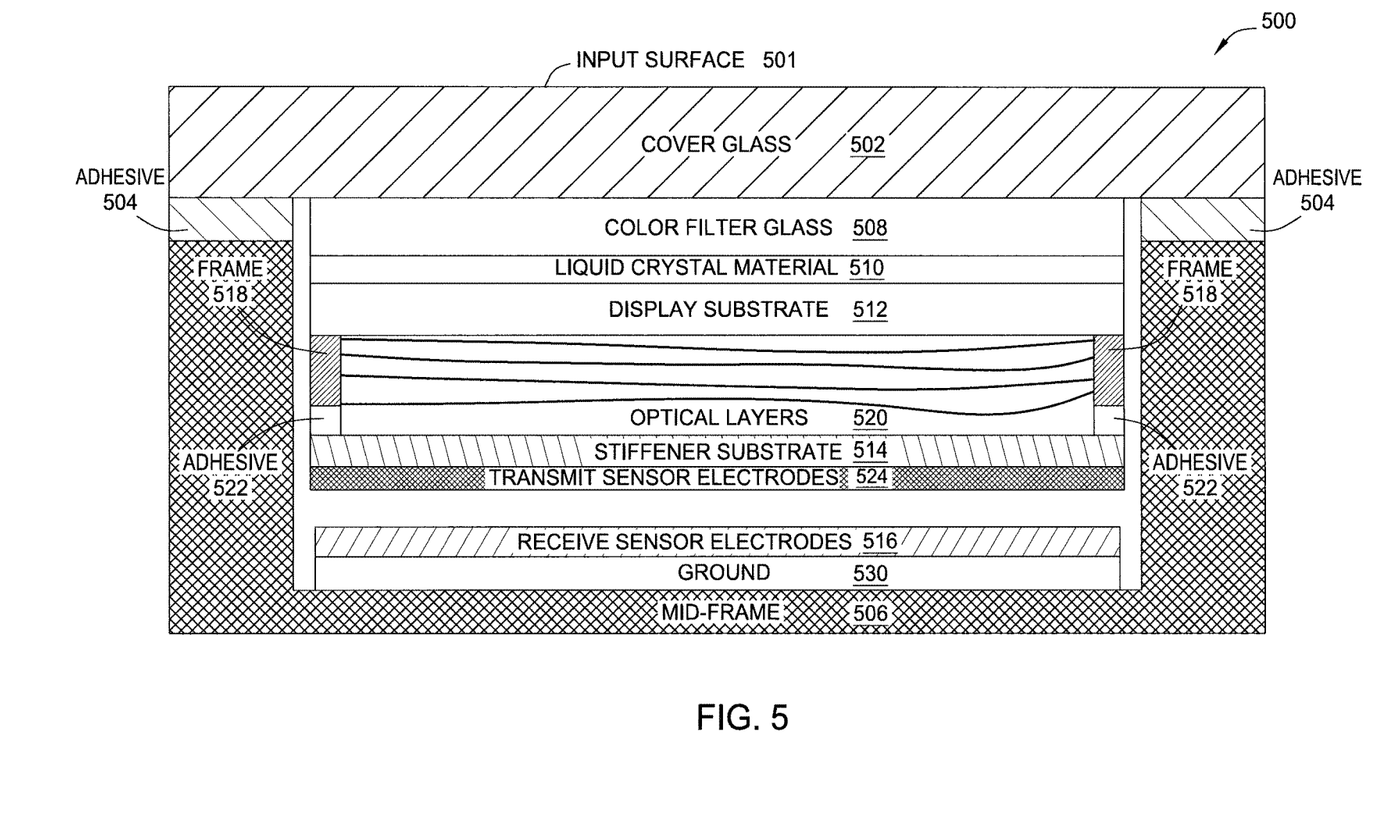
FIG. 5 illustrates another example force sensing input device according to an embodiment.

FIG. 5 illustrates another example force sensing input device 500 according to one embodiment. Many of the components illustrated in FIG. 5 are similar to those in FIGS. 3 and 4. Cover glass 502 is disposed above various layers of the input device 500. Cover glass 502 also comprises an input surface 501 that receives an input from a user, such as a force or a touch input. Below cover glass 502 are color filter glass 508, liquid crystal material 510, and a display substrate 512. Below display substrate 512 are a variety of optical layers 520. Edges of the optical layers 520 are secured to the frame 518. Frame 518 is secured to display substrate 512, for example with an adhesive. Adhesive 504 couples mid-frame 506 to cover glass 502.

In force sensing input device 500, stiffener substrate 514 is attached to frame 518 with adhesive 522. Transmit (TX) sensor electrodes 524 of an imaging capacitive sensor are attached or patterned onto stiffener substrate 514. Receive (RX) sensor electrodes 516 of an imaging capacitive sensor are glued or otherwise affixed to ground 530, which is affixed to mid-frame 506. In some embodiments, a shield layer (not illustrated) resides beneath receive sensor electrodes 516 to shield the receiver electrodes. Transmit sensor electrodes 524 comprises any suitable number of transmitter electrodes and receive sensor electrodes 516 comprises any suitable number of receive electrodes. In another embodiment, receive sensor electrodes 516 are attached or patterned onto stiffener substrate 514 while transmit sensor electrodes 524 are glued or otherwise affixed to ground 530, which is affixed to mid-frame 506.

Transmit sensor electrodes 524 and receive sensor electrodes 516 determine force by measuring a change in capacitance when a force is applied to input surface 501 of cover glass 502 by an input object 140. When the force is applied, stiffener substrate 514 and transmit sensor 524 are deflected downward towards receive sensor 516. A distance between a first force sensing element and a second force sensing element decreases when the display substrate 512 and other layers are deflected due to the force. Force is determined by measuring a change in capacitance between transmit sensor electrodes 524 and receive sensor electrodes 516. In other embodiments, receive sensor electrodes 516 may be affixed or patterned onto stiffener substrate 514 while transmit sensor electrodes 524 are glued or otherwise affixed to ground 530.

Figure 6:
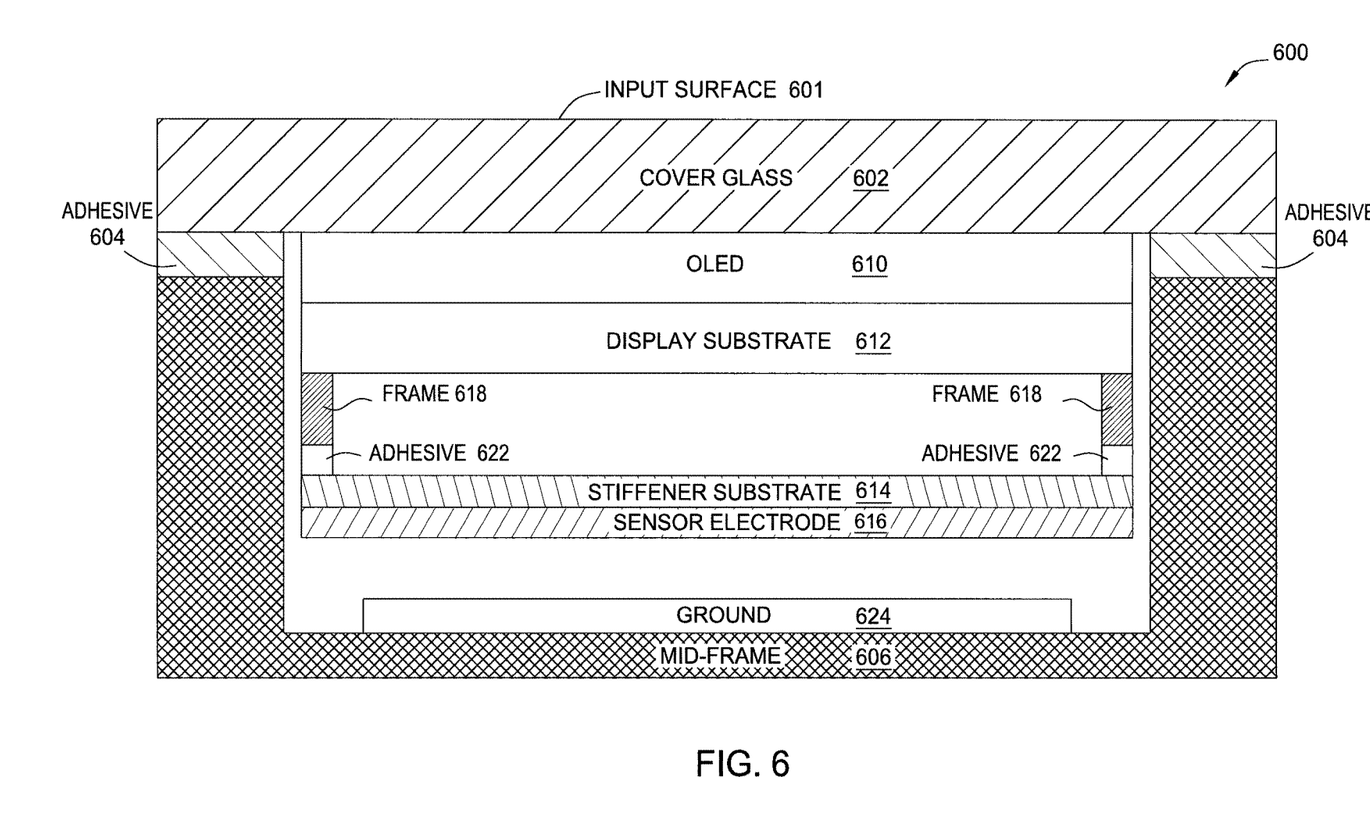
FIG. 6 illustrates another example force sensing input device according to an embodiment.

FIG. 6 illustrates another example force sensing input device that comprises an OLED device 600 according to one embodiment. Many of the components illustrated in FIG. 6 are similar to those in FIGS. 3-5. However, in this embodiment, the force sensing input device comprises an OLED device 600.

Cover glass 602 is disposed above various layers of OLED device 600. Cover glass 602 also comprises an input surface 601 that receives an input from a user, such as a force or a touch input. Below cover glass 602 are OLED 610 and a display substrate 612. Display substrate 612 can comprise either glass or a substrate. In addition, the display substrate 612 could comprise a TFT layer. Below display substrate 612 is frame 618. Frame 618 is attached to display substrate 612 with an adhesive. Adhesive 604 couples mid-frame 606 to cover glass 602. Stiffener substrate 614 is attached to frame 618 with adhesive 622. Ground 624 is glued or otherwise affixed to mid-frame 606.

In this embodiment, a force applied to input surface 601 of cover glass 602 by an input object 140 causes stiffener substrate 614 to deflect. Sensor electrode 616 is affixed to or patterned onto stiffener substrate 614. The force deflects sensor electrode 616 downward toward ground 624, so that the distance between sensor electrode 616 and ground 624 decreases. Force is determined by measuring a change in capacitance detected by sensor electrode 616. Therefore embodiments described herein can also be used to detect force in an OLED device.

Similar to FIG. 4 above, in another embodiment the OLED device 600 of FIG. 6 could comprise a ground layer attached to stiffener substrate 614 and the sensor electrode 616 attached to mid-frame 606. Additionally, similar to FIG. 5 above, in another embodiment the OLED device 600 of FIG. 6 could comprise transmit sensor electrodes attached to or patterned onto stiffener substrate 614 and receive sensor electrodes attached to ground 624.

Figure 7:
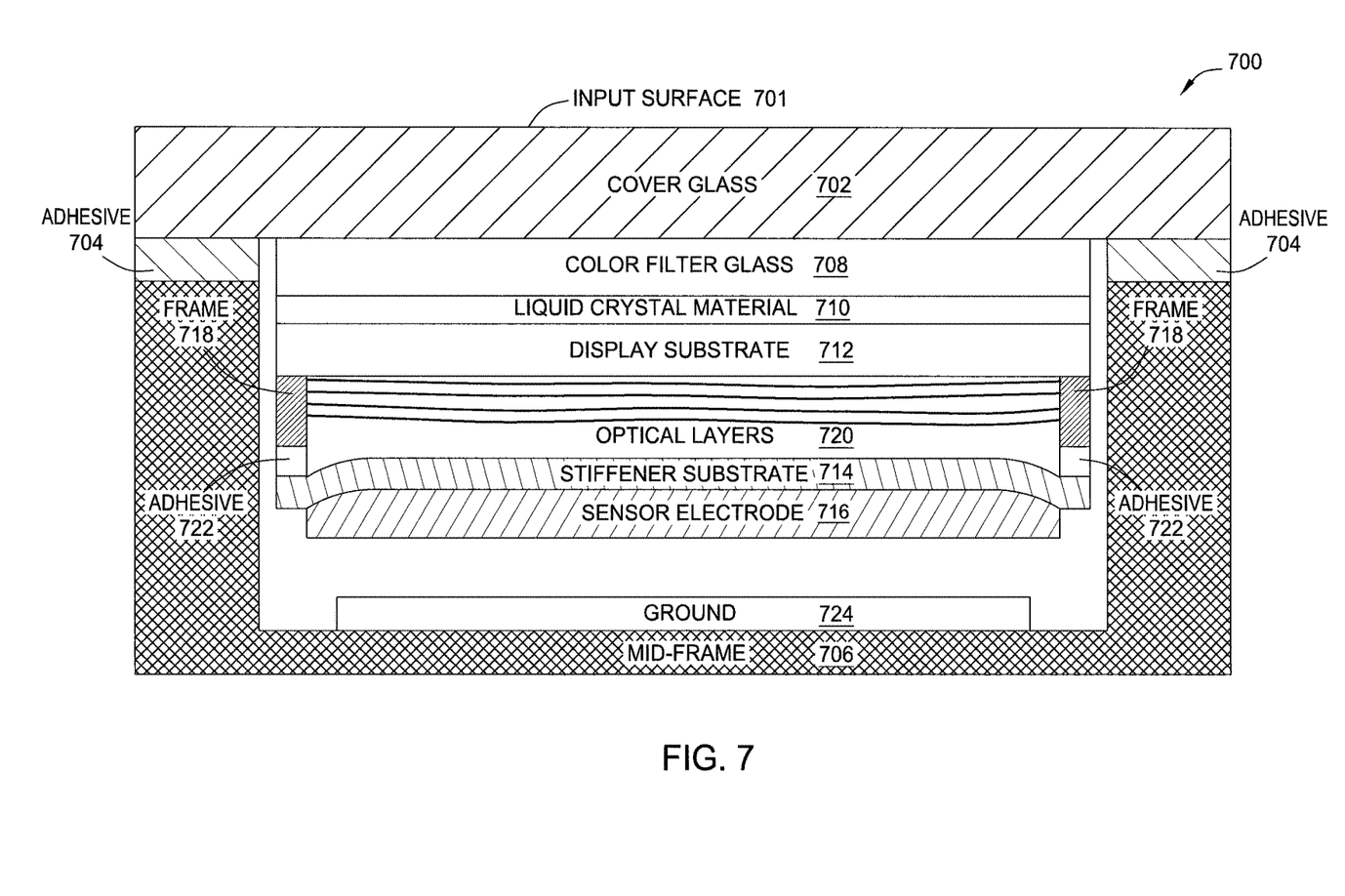
FIG. 7 illustrates another example force sensing input device according to an embodiment.

FIG. 7 illustrates another example force sensing input device 700 according to one embodiment. Many of the components illustrated in FIG. 7 are similar to those in FIGS. 3-6. Cover glass 702 is disposed above various layers of the input device 700. Cover glass 702 also comprises an input surface 701 that receives an input from a user, such as a force or a touch input. Below cover glass 702 are color filter glass 708, liquid crystal material 710, and a display substrate 712. Below display substrate 712 are a variety of optical layers 720. Edges of the optical layers 720 are secured to the frame 718. Frame 718 is secured to display substrate 712, for example with an adhesive. Adhesive 704 couples mid-frame 706 to cover glass 702.

In force sensing input device 700, stiffener substrate 714 is attached to frame 718 with adhesive 722. In this embodiment, stiffener substrate 714 has been shaped to have a convex shape. Stiffener substrate 714 may have a concave shape in other embodiments, or any other suitable shape. As noted above, any of the embodiments described herein can utilize a shaped stiffener substrate 714.

Sensor electrode 716 is attached to the stiffener substrate 714. Sensor electrode 716 can be patterned onto stiffener substrate 714, adhered to stiffener substrate 714, or attached to stiffener substrate 714 in any other suitable manner. Sensor electrodes that comprise sensor electrode 716 can be printed or deposited directly on stiffener substrate 714 in some embodiments. In other embodiments, sensor electrodes that comprise sensor electrode 716 can be printed on a thin substrate that is adhered to stiffener substrate 714.

As described above with respect to FIGS. 3-6, when a force is applied to input surface 701 of cover glass 702 by an input object 140, sensor electrode 716 moves in sync with cover glass 702. The force causes the stack of layers (cover glass 702, and layers 708, 710, and 712, stiffener substrate 714, frame 718, and sensor electrode 716) to deflect a distance relative to the size of the applied force towards ground 724.

An adhesive 704 couples mid-frame 706 to cover glass 702. Force sensing is performed between sensor 716 and ground 724. Force is determined by measuring a change in capacitance detected by sensor 716 when a deflection occurs due to an applied force.

Figure 8:
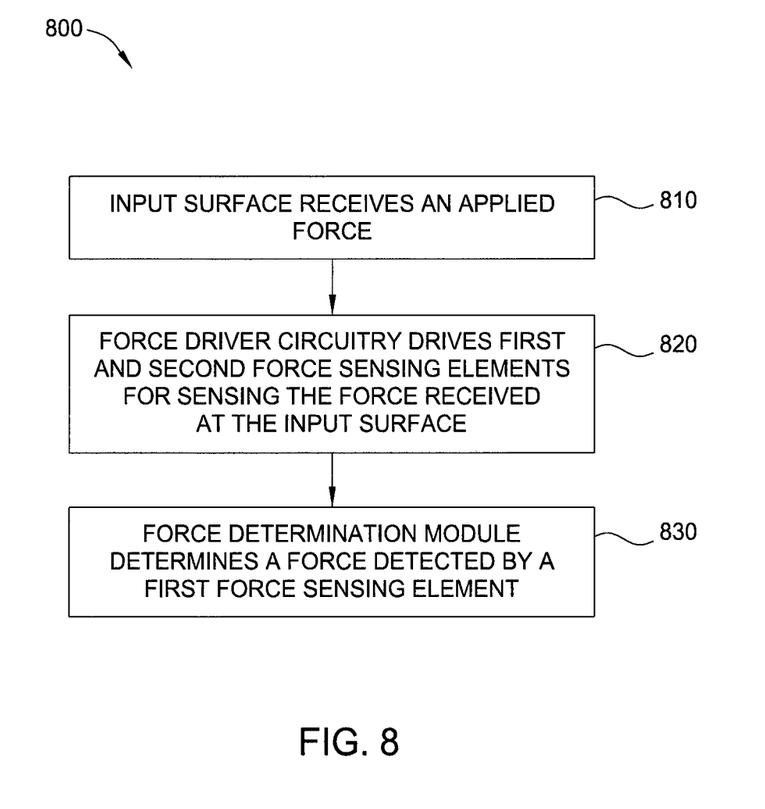
FIG. 8 is a flowchart illustrating a method for sensing force in a touch display.

FIG. 8 is a flow diagram illustrated a method 800 for measuring force. Although the method steps are described in conjunction with the systems of FIGS. 1-7, persons skilled in the art will understand that any system configured to perform the method steps, in any feasible order, falls within the scope of the present invention. In various embodiments, the hardware and/or software elements described above in FIGS. 1-7 can be configured to perform the method steps of FIG. 8.

The method begins at step 810, where an input surface receives an applied force. The method proceeds to step 820, where force driver circuitry 240 drives a first force sensing element and a second force sensing element for sensing the force applied to the input surface. In this example embodiment, the force applied to an input surface causes a stiffener substrate to deflect.

The method proceeds to step 830, where force determination module 250 determines a force detected by a first force sensing element. As described above, the stiffener substrate and force sensing elements deflect when a force is applied to an input surface. A first force sensing element deflects toward a second force sensing element when the force is applied to the input surface, because the first force sensing element is disposed on the stiffener substrate. Force determination module 250 measures the deflection and determines the amount of force applied to the input surface based on the deflection.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

What is claimed is:

1. A display device, comprising:
a display substrate;
a frame disposed below and secured to the display substrate, the frame being configured to deflect when a force is applied to the display substrate;
a force sensor layer disposed below the frame, the force sensor layer comprising at least one first force sensing element;
a stiffener substrate disposed below the frame and above the force sensor layer, wherein the stiffener substrate is stiffer than the force sensor layer to cause the force sensor layer to move in sync with the display substrate and the frame when the force is applied to the display substrate;
one or more intervening layers having edges secured to the frame, wherein the one or more intervening layers are disposed between the display substrate and the stiffener substrate and contact the stiffener substrate along an interface, the one or more intervening layers being configured to bend or compress under the application of force to transmit the force to the stiffener substrate along the interface; and
a second force sensing element, wherein a distance between the first force sensing element and the second force sensing element changes relative to a size of the force applied to the display substrate.

2. The display device of claim 1, wherein the stiffener substrate is a metal material.

3. The display device of claim 1, wherein the stiffener substrate comprises a concave, convex, or flat shape.

4. The display device of claim 1, wherein the one or more intervening layers comprises one or more optical layers.

5. The display device of claim 1 further comprising:
a processing system configured to drive the first force sensing element for absolute capacitance sensing to detect changes in absolute capacitive coupling between the first force sensing element and the second force sensing element.

6. The display device of claim 1 further comprising:
a processing system configured to drive the second force sensing element for absolute capacitance sensing to detect changes in absolute capacitive coupling between the first force sensing element and the second force sensing element.

7. The display device of claim 1 further comprising:
a processing system configured to drive the first force sensing element for transcapacitive sensing to detect changes in capacitive coupling between a transmitter electrode of the first force sensing element and a receiver electrode of the second force sensing element.

8. The display device of claim 1 further comprising:
a processing system configured to drive the first force sensing element for transcapacitive sensing to detect changes in capacitive coupling between a receiver electrode of the first force sensing element and a transmitter electrode of the second force sensing element.

9. The display device of claim 1 further comprising:
a processing system configured to drive the first force sensing element for transcapacitive sensing to detect changes in capacitive coupling between a transmitter electrode of the first force sensing element and a receiver electrode of the first force sensing element.

10. The display device of claim 1 further comprising:
a processing system configured to drive the first force sensing element for transcapacitive sensing to detect changes in capacitive coupling between a transmitter electrode of the second force sensing element and a receiver electrode of the second force sensing element.

11. The display device of claim 1, wherein the second force sensing element is coupled to a mid-frame of an input device.

12. An input device, comprising:
a plurality of capacitive sensing electrodes configured to receive a signal; and
a display device coupled to the plurality of capacitive sensing electrodes, the display device comprising:
a display substrate;
a frame disposed below and secured to the display substrate, the frame being configured to deflect when a force is applied to the display substrate;
a force sensor layer disposed below the frame, the force sensor layer comprising at least one first force sensing element;
a stiffener substrate disposed below the frame and above the force sensor layer, wherein the stiffener substrate is stiffer than the force sensor layer to cause the force sensor layer to move in sync with the display substrate and the frame when the force is applied to the display substrate;
one or more intervening layers having edges secured to the frame, wherein the one or more intervening layers are disposed between the display substrate and the stiffener substrate and contact the stiffener substrate along an interface, the one or more intervening layers being configured to bend or compress under the application of force to transmit the force to the stiffener substrate along the interface; and a second force sensing element, wherein a distance between the first force sensing element and the second force sensing element changes relative to a size of the force applied to the display substrate.

13. The input device of claim 12, wherein the one or more intervening layers comprises one or more optical layers.

14. The input device of claim 12, wherein the display substrate is a thin film transistor (TFT) substrate.

15. The input device of claim 12, wherein the first force sensing element comprises at least one transmitter electrode and the second force sensing element comprises at least one receiver electrode.

16. The input device of claim 12, wherein the first force sensing element comprises at least one receiver electrode and the second force sensing element comprises at least one transmitter electrode.

17. The input device of claim 12, wherein the first force sensing element comprises at least one transmitter electrode and at least one receiver electrode.

18. The input device of claim 12, wherein the second force sensing element comprises at least one transmitter electrode and at least one receiver electrode.

19. The input device of claim 12 further comprising:
a processing system configured to drive the first force sensing element for absolute capacitance sensing to detect changes in absolute capacitive coupling between the first force sensing element and the second force sensing element.

20. The input device of claim 12 further comprising:
a processing system configured to drive the second force sensing element for absolute capacitance sensing to detect changes in absolute capacitive coupling between the first force sensing element and the second force sensing element.

21. An input device for force sensing, comprising:
a display substrate;
a frame disposed below and secured to the display substrate, the frame being configured to deflect when a force is applied to the display substrate;
a force sensor layer disposed below the frame, the force sensor layer comprising at least one first force sensing element;
a stiffener substrate disposed below the frame and above the force sensor layer, wherein the stiffener substrate is stiffer than the force sensor layer to cause the force sensor layer to move in sync with the display substrate and the frame when the force is applied to the display substrate;
one or more intervening layers having edges secured to the frame, wherein the one or more intervening layers are disposed between the display substrate and the stiffener substrate and contact the stiffener substrate along an interface, the one or more intervening layer being configured to bend or compress under the application of force to transmit the force to the stiffener substrate along the interface;
one or more processors; and
a memory storing instructions that, when executed by the one or more processors, cause a processing system to:
drive first voltages to the display substrate;
drive second voltages to the first force sensing element of the force sensor layer; and
receive signals from a second force sensing element, wherein a distance between the first force sensing element and the second force sensing element changes relative to a size of the force applied to the display substrate.

22. The input device of claim 21, wherein the one or more intervening layers comprises one or more optical layers.

* * * * *